US012698807B2

(12) United States Patent
Jadhav et al.

(10) Patent No.: US 12,698,807 B2
(45) Date of Patent: Aug. 4, 2026

(54) SELF-ALIGNING COUPLER

(71) Applicants: Tushar Anandrao Jadhav, Maharshtra (IN); Sheela Tushar Jadhav, Maharshtra (IN)

(72) Inventors: Tushar Anandrao Jadhav, Maharshtra (IN); Sheela Tushar Jadhav, Maharshtra (IN)

( * ) Notice: Subject to any disclaimer, the term of this patent is extended or adjusted under 35 U.S.C. 154(b) by 114 days.

(21) Appl. No.: 18/559,273

(22) PCT Filed: Sep. 21, 2022

(86) PCT No.: PCT/IN2022/050844
§ 371 (c)(1),
(2) Date: Nov. 6, 2023

(87) PCT Pub. No.: WO2023/047414
PCT Pub. Date: Mar. 30, 2023

(65) Prior Publication Data
US 2024/0240676 A1     Jul. 18, 2024

(30) Foreign Application Priority Data

Sep. 27, 2021    (IN) ............................. 202121043687

(51) Int. Cl.
*F16D 3/26* (2006.01)
(52) U.S. Cl.
CPC .................................. *F16D 3/265* (2013.01)
(58) Field of Classification Search
CPC .......... F16B 2200/95; F16D 3/02; F16D 3/04; F16D 3/16; F16D 3/20; F16D 3/26; F16D 3/265; F16D 3/30; F16D 3/34; F16D 3/44; F16D 3/50; F16D 3/72; Y10T 403/20; Y10T 403/32008; Y10T 403/32041; Y10T 403/32049; Y10T 403/32057; Y10T 403/32073; Y10T 403/32622
USPC ........ 403/27, 53, 57, 58, 59, 61, 121; 411/8, 411/13, 14; 464/102, 103, 104, 105, 106, 464/110, 147, 155
See application file for complete search history.

(56) References Cited

U.S. PATENT DOCUMENTS

| | | | | |
|---|---|---|---|---|
| 540,749 A | * | 6/1895 | Mannesmann | ......... F16D 3/265 464/110 |
| 1,135,510 A | * | 4/1915 | Filipietz | ................. F16D 3/221 464/110 |

(Continued)

FOREIGN PATENT DOCUMENTS

| | | | | |
|---|---|---|---|---|
| FR | 624874 A | * | 7/1927 | ............. F16D 3/265 |
| GB | 979442 A | * | 1/1965 | ............. F16D 3/265 |
| WO | WO-2014035241 A1 | * | 3/2014 | ............ F16B 1/0071 |

*Primary Examiner* — Josh Skroupa

(57) ABSTRACT

A self-aligning coupler 100 for power transmission between misaligned and non-collinear driving shaft and driven shaft is disclosed. The self-aligning coupler 100 has at least a first extreme position, an intermediate position and a third extreme position. The first coupler 104 is connected to the second coupler 112 by a tie rod 108. One end of the first coupler 104 includes a central hole 320 for receiving a driving shaft and another end of the first coupler 104 includes a first arcuate opening 324 for receiving the tie rod 108. One end of the second coupler has a central hole 326 including a driving shaft and another end of the second coupler 112 has a second arcuate opening 328. The tie rod 108 has three degrees of freedom of movement.

11 Claims, 17 Drawing Sheets

(56)                    References Cited

U.S. PATENT DOCUMENTS

| | | | | |
|---|---|---|---|---|
| 1,271,905 A * | 7/1918 | Jones | .................... | F16D 3/265 |
| | | | | 464/110 |
| 1,567,057 A * | 12/1925 | Johnson | ................. | F16D 3/265 |
| | | | | 464/110 |
| 2,251,126 A * | 7/1941 | Gatke | .................... | F16D 3/265 |
| | | | | 464/110 |
| 2,780,079 A * | 2/1957 | Wahlberg | ............... | F16D 3/265 |
| | | | | 464/110 |
| 2,792,693 A * | 5/1957 | Norlindh | ................ | F16D 3/265 |
| | | | | 464/110 |
| 3,452,556 A * | 7/1969 | Einhorn | ................. | F16D 3/265 |
| | | | | 464/110 |
| 3,611,749 A * | 10/1971 | Kasperczyk | ............. | F16D 3/20 |
| | | | | 464/106 |
| 3,914,959 A * | 10/1975 | Leksen | .................. | F16D 3/265 |
| | | | | 464/110 |
| 4,151,728 A * | 5/1979 | Kimball | ................. | F16D 3/265 |
| | | | | 464/97 |
| 7,257,903 B2 * | 8/2007 | Lee | ........................ | G01C 15/06 |
| | | | | 33/42 |
| 7,788,815 B2 * | 9/2010 | Yandrick | ............... | G01C 15/06 |
| | | | | 33/294 |
| 9,228,615 B2 * | 1/2016 | Grimmel | ................ | F16D 3/265 |

* cited by examiner

500

508

504

512

SELF-ALIGNING COUPLER

FIELD OF THE INVENTION

The present invention relates to a coupler for connecting two shafts and more particularly to a self-aligning coupler connecting two shafts inclined with each other and located in different planes.

BACKGROUND OF THE INVENTION

Machining and automation in various fields like manufacturing, construction, steel industry, food technology, aerospace, etc. has increased significantly in the past decade. With these advancements in technology, machinery around various fields is becoming more efficient and complex. Coupler assemblies and universal couplers are such components that have gained popularity in complex machines.

Various ways of coupling two rotational shafts together are known in the art. Couplings are used in the art for transmitting motion or power from one shaft to another. Currently in the prior art various universal couplers and joints are used for transmitting motion. However, the drawback of these types of universal couplers is that connecting shafts positioned far apart from each other is not possible. Another drawback of these types of universal couplers/joints is that flexibility of the joint is extremely limited causing frequent fractures and failures during operation.

U.S. Pat. No. 1,178,529A discloses a universal shaft-coupling having joints for shafting such as are adapted to communicate rotary movement from one section of a shaft to another whether the same be in line, or in parallel lines and offset, or at an angle to each other. The drawback of this type of invention is that the coupling has limited degree of freedom. Another drawback of this type of invention is that shafts that are far apart from each other are not connectable by this coupling.

U.S. Pat. No. 8,317,628B2 discloses a flexible shaft connection and method. The patent relates to couplings that can transmit rotational torque between two shafts and/or hubs, while accommodating center-line misalignment between the shafts on both sides of the coupling. The drawback of this type of invention is that the connection has limited degree of freedom. Another drawback of this type of invention is that the connection fails to account for planar misalignment of shafts. Another drawback of this type of invention is that shafts that are far apart from each other are not connectable by this coupling.

There is a need of a coupler for connecting two shafts. Further there is a need of a self-aligning coupler connecting two shafts inclined with each other and located in different planes.

BRIEF DESCRIPTION OF DRAWINGS

The objectives and advantages of the present invention will become apparent from the following description read in accordance with the accompanying drawings wherein.

Figures 1A, 1B:
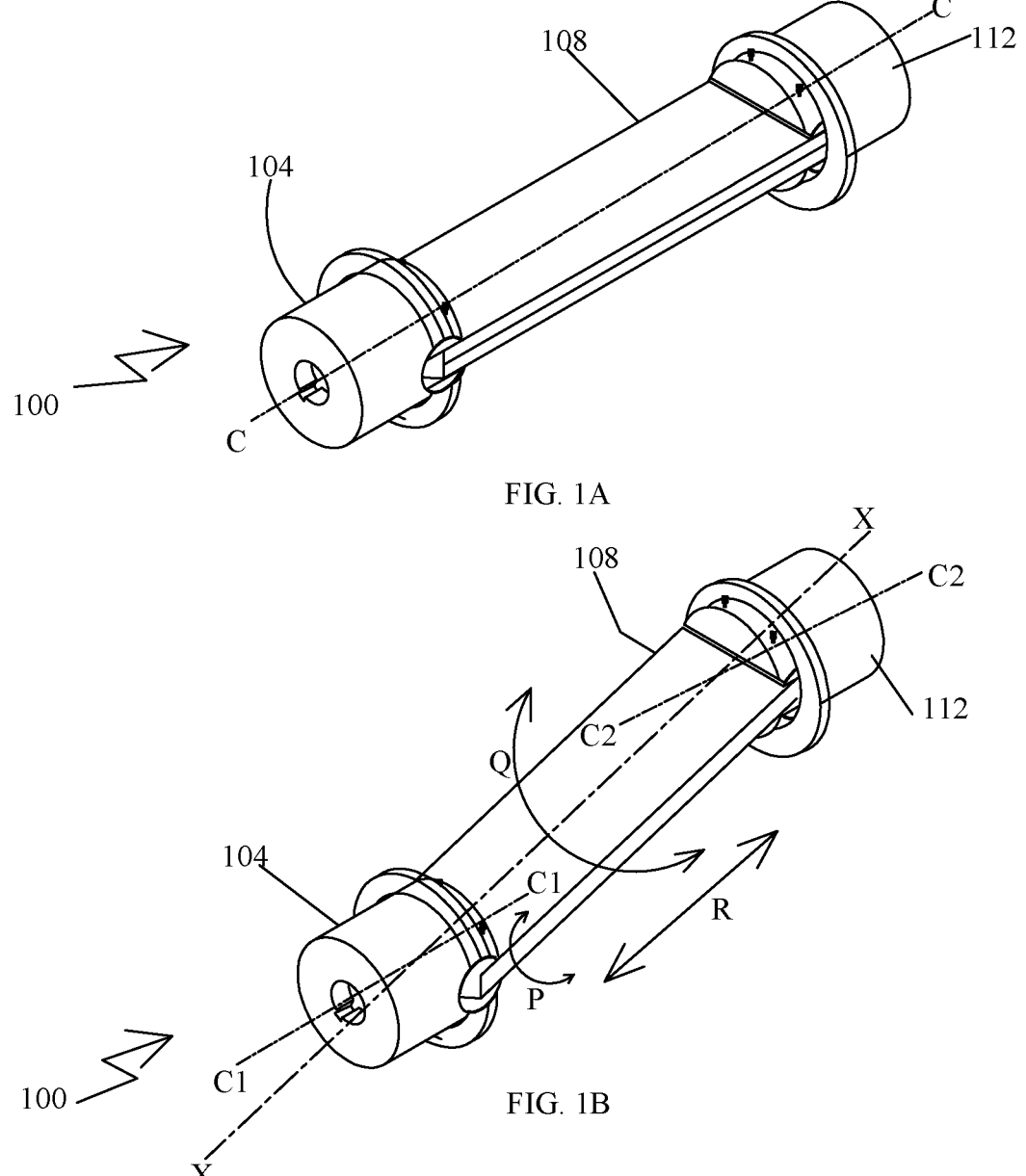
FIG. 1A is a perspective view of a self-aligning coupler in accordance with a preferred embodiment of the present invention wherein a first coupler and the second coupler are connected to shafts that are in collinear position along a central axis-C.
FIG. 1B is a perspective view of a self-aligning coupler in accordance with a preferred embodiment of the present invention wherein the first coupler with a central axis-C1 and the second coupler with a central axis-C2 that are connected to shafts that are in misaligned position.
Figure 2A:
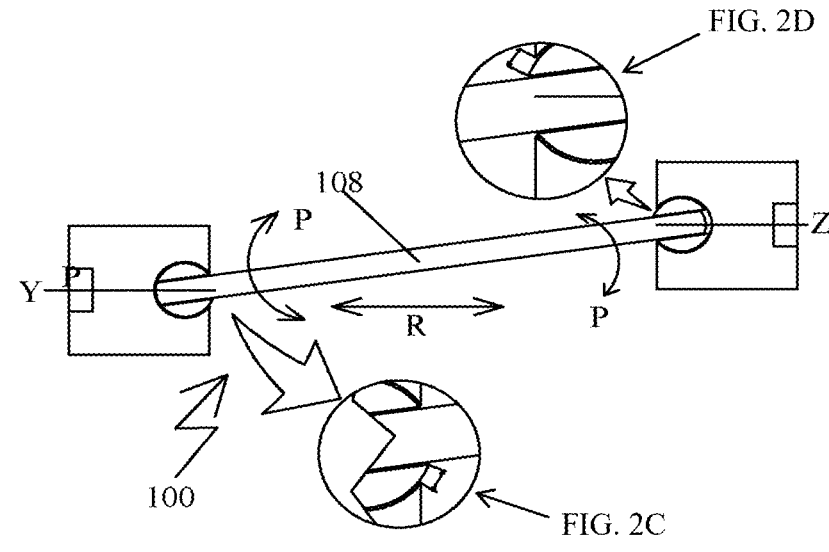
Figure 2B:
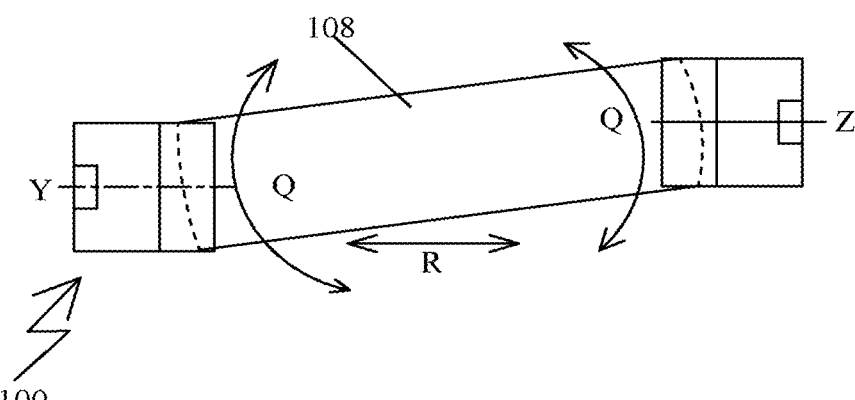
Figure 3:
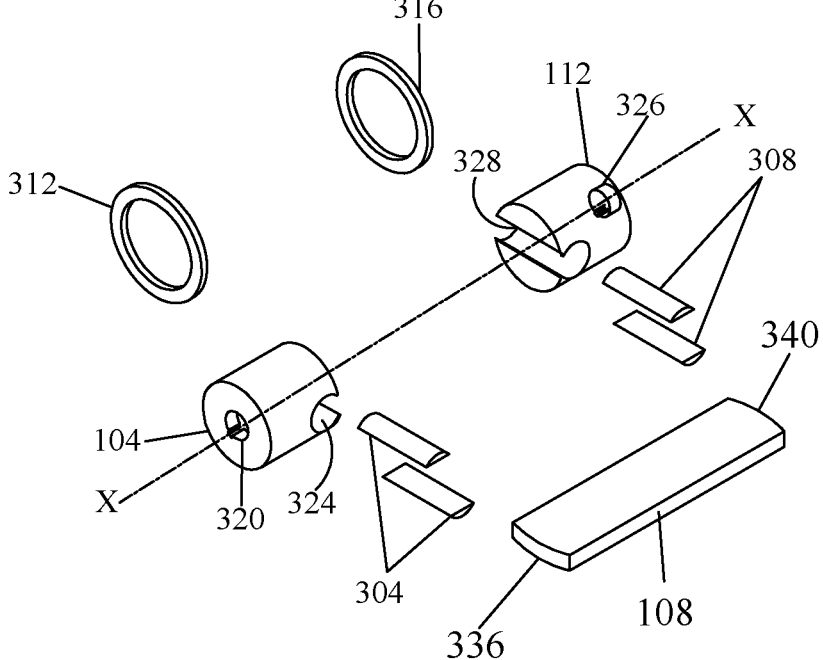
Figures 4A, 4B, 4C:
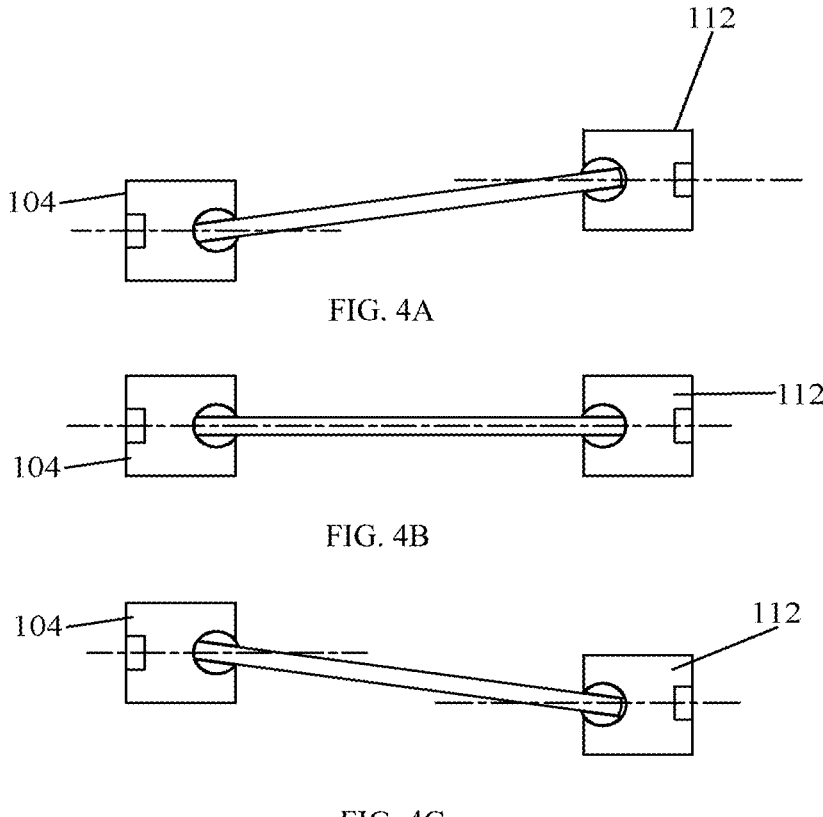
Figure 5:
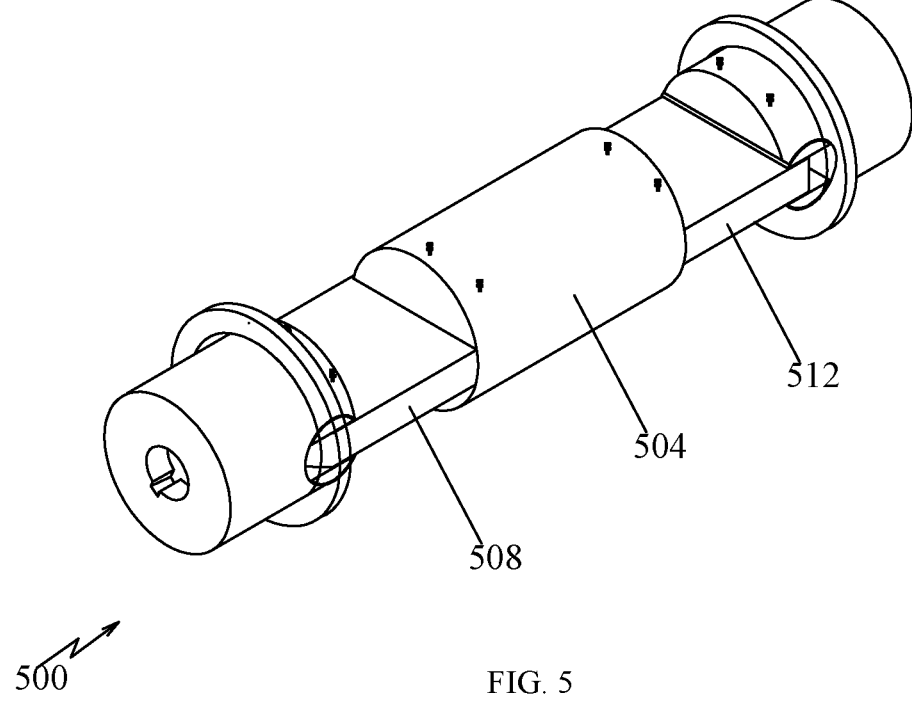
Figure 5A:
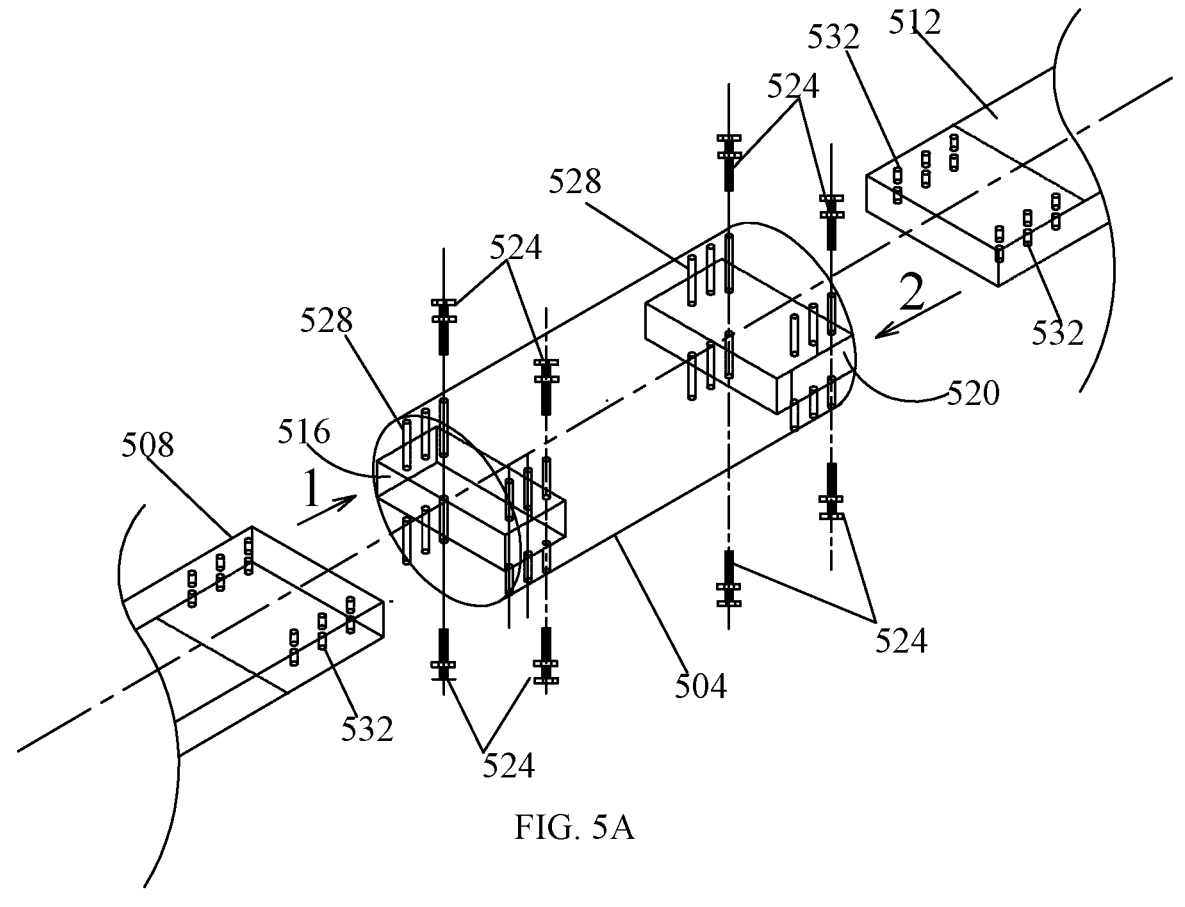
Figure 6A:
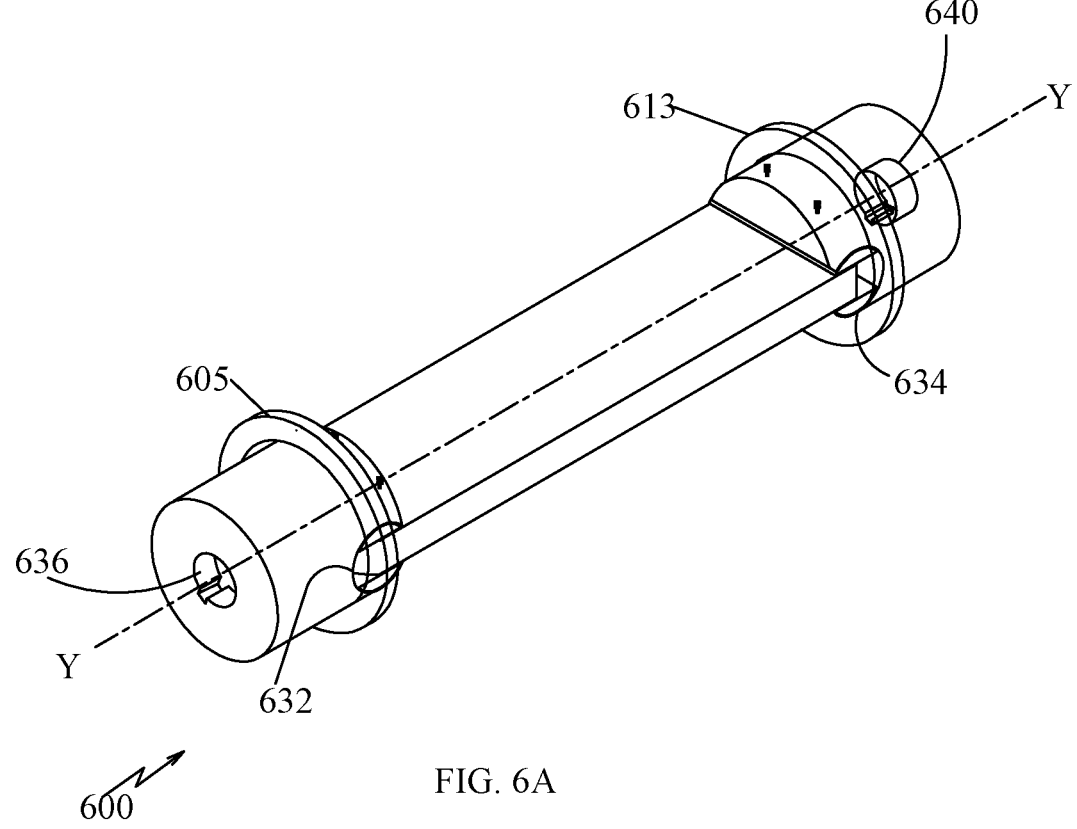
Figures 6B, 6C:
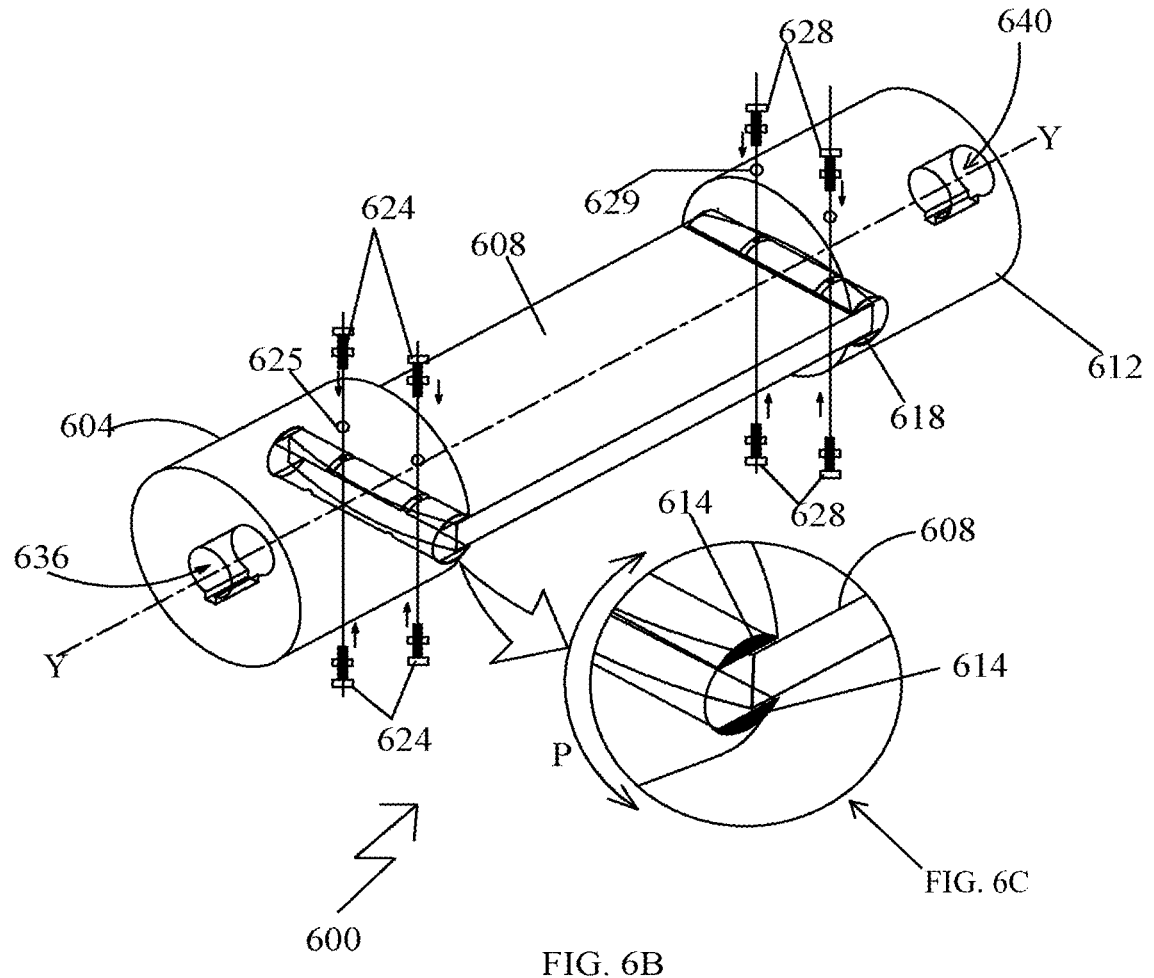
Figure 7:
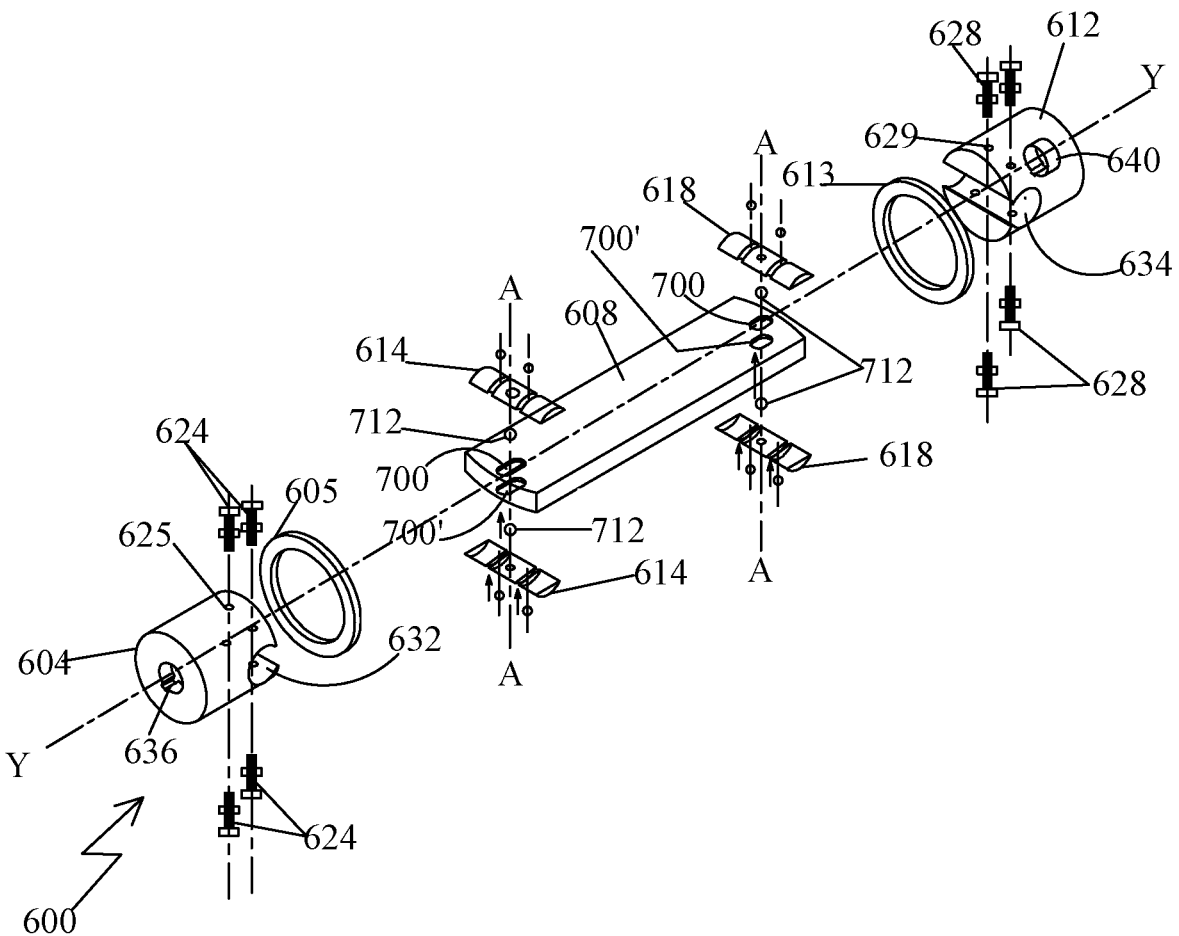
Figure 8:
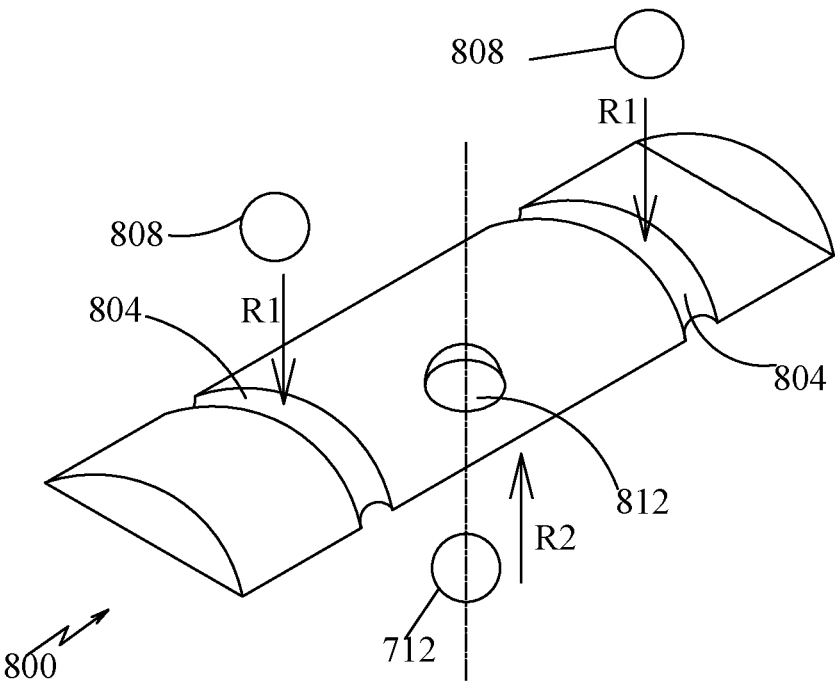
Figure 9:
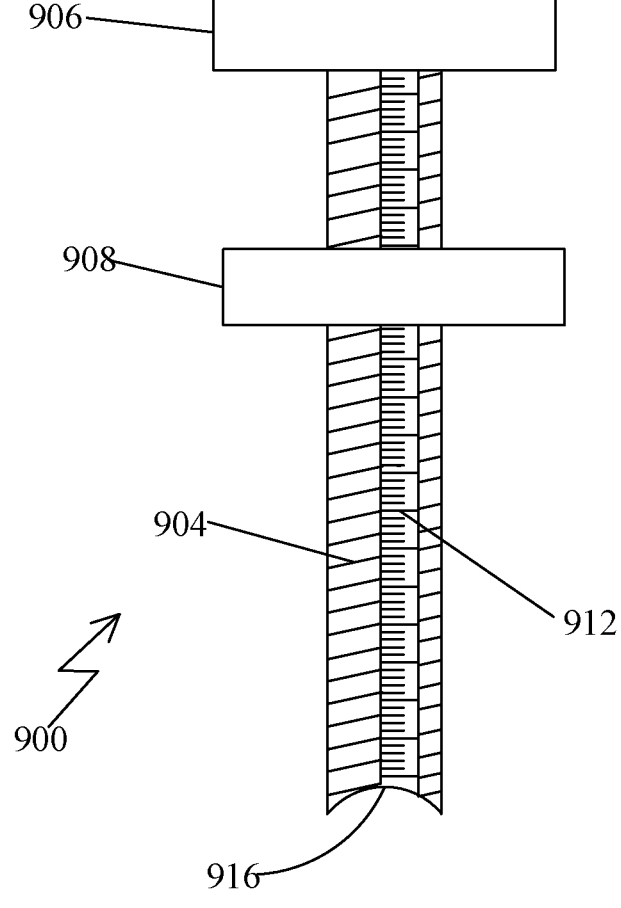
Figures 10A, 10F, 10G, 10H:
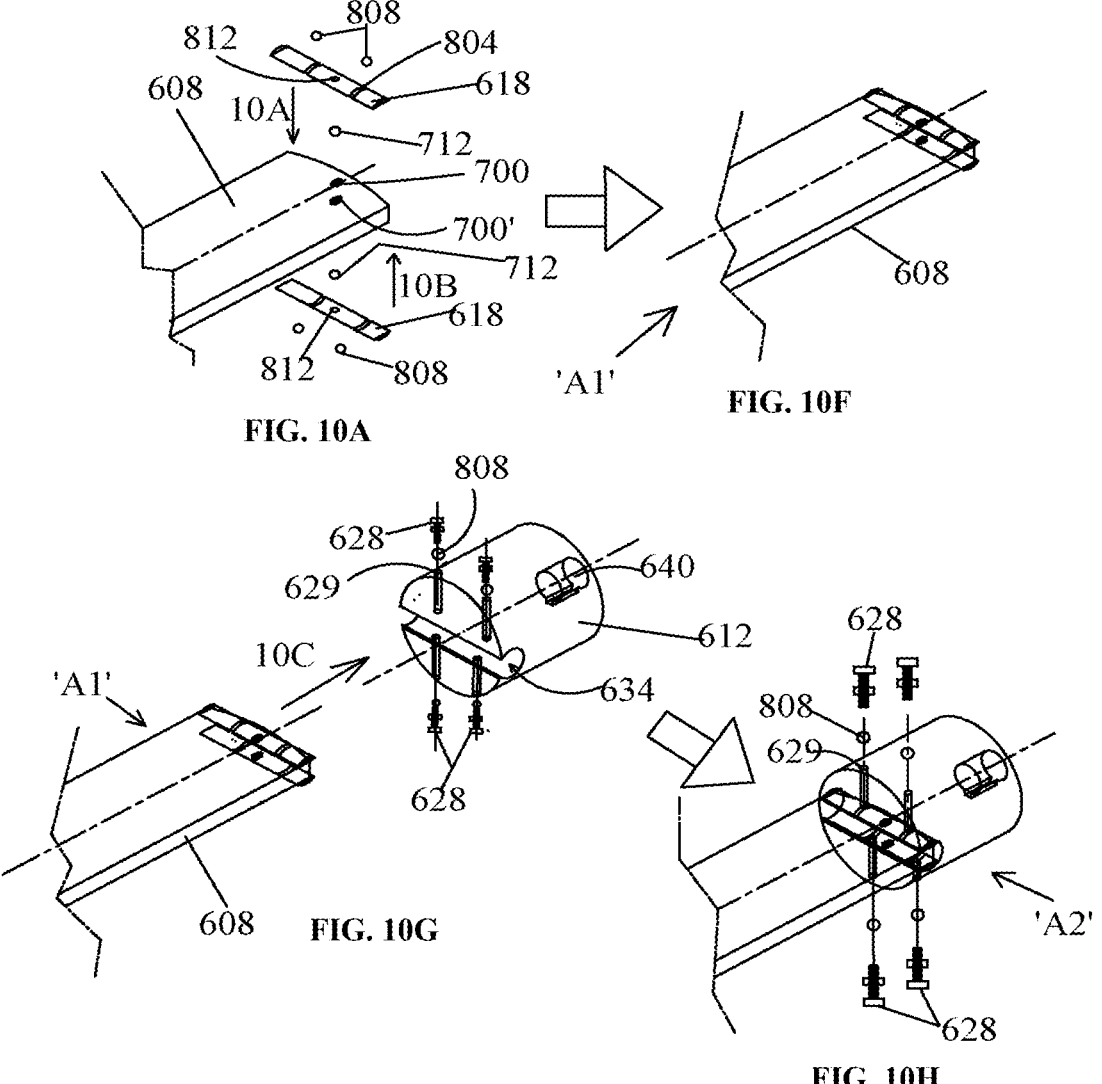
Figure 10B:
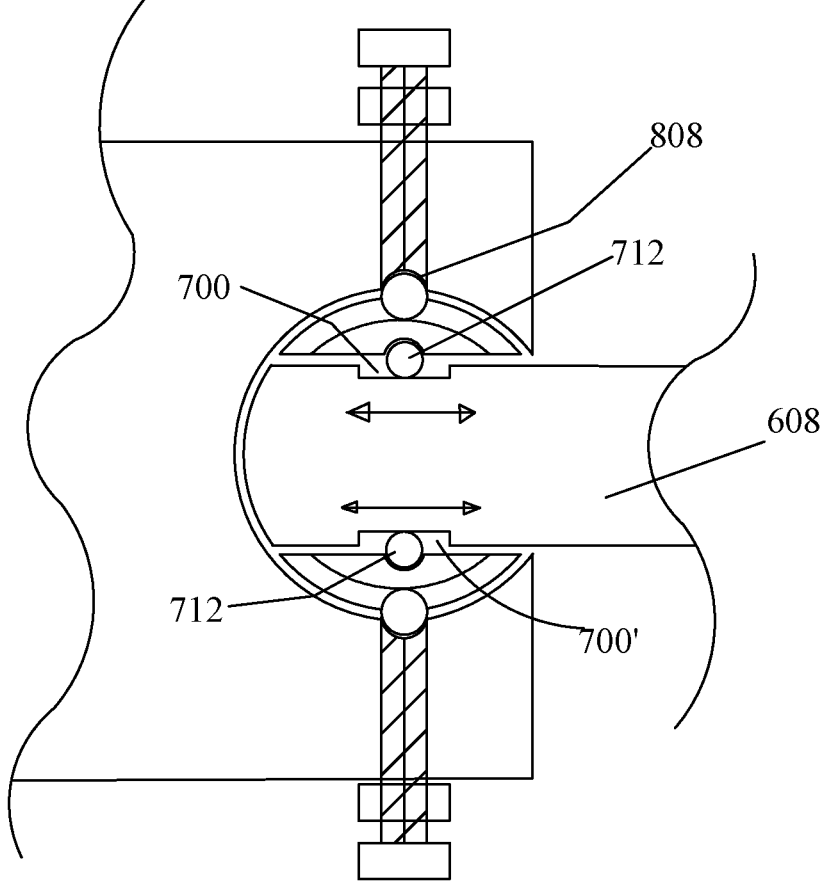
Figure 10C:
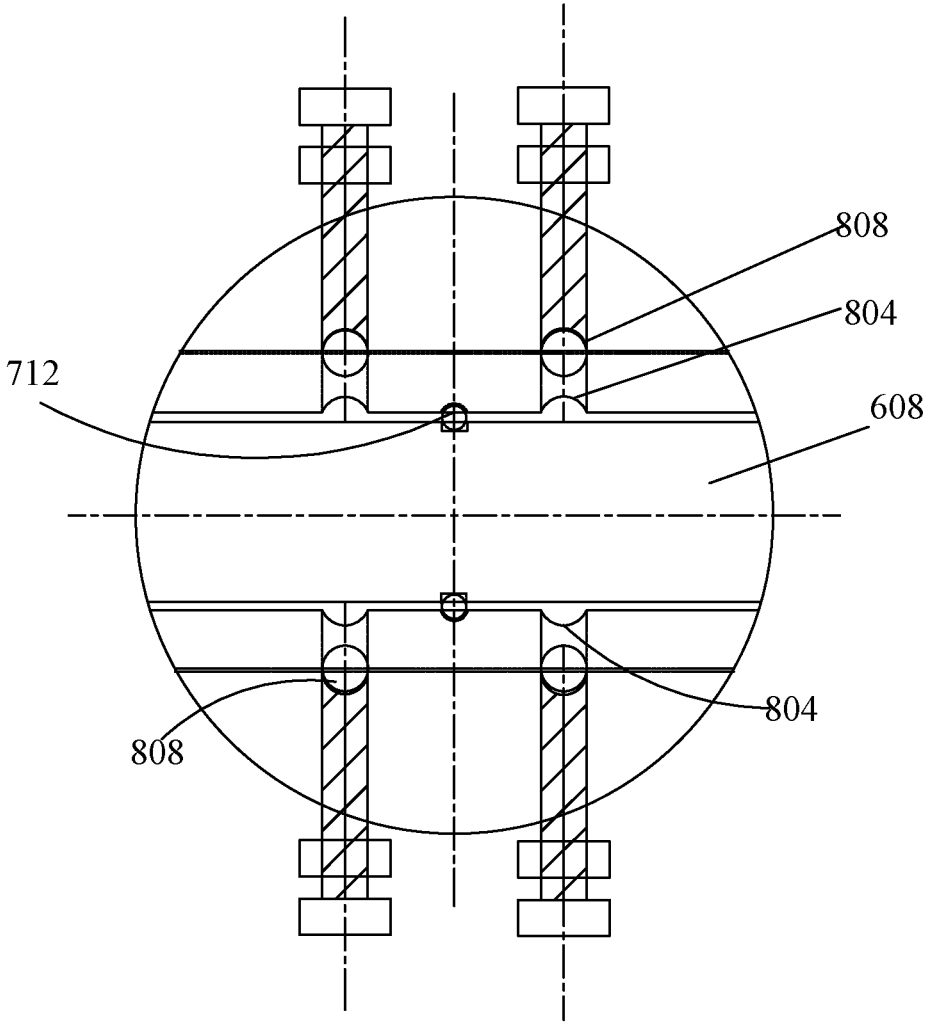
Figures 10D, 10E:
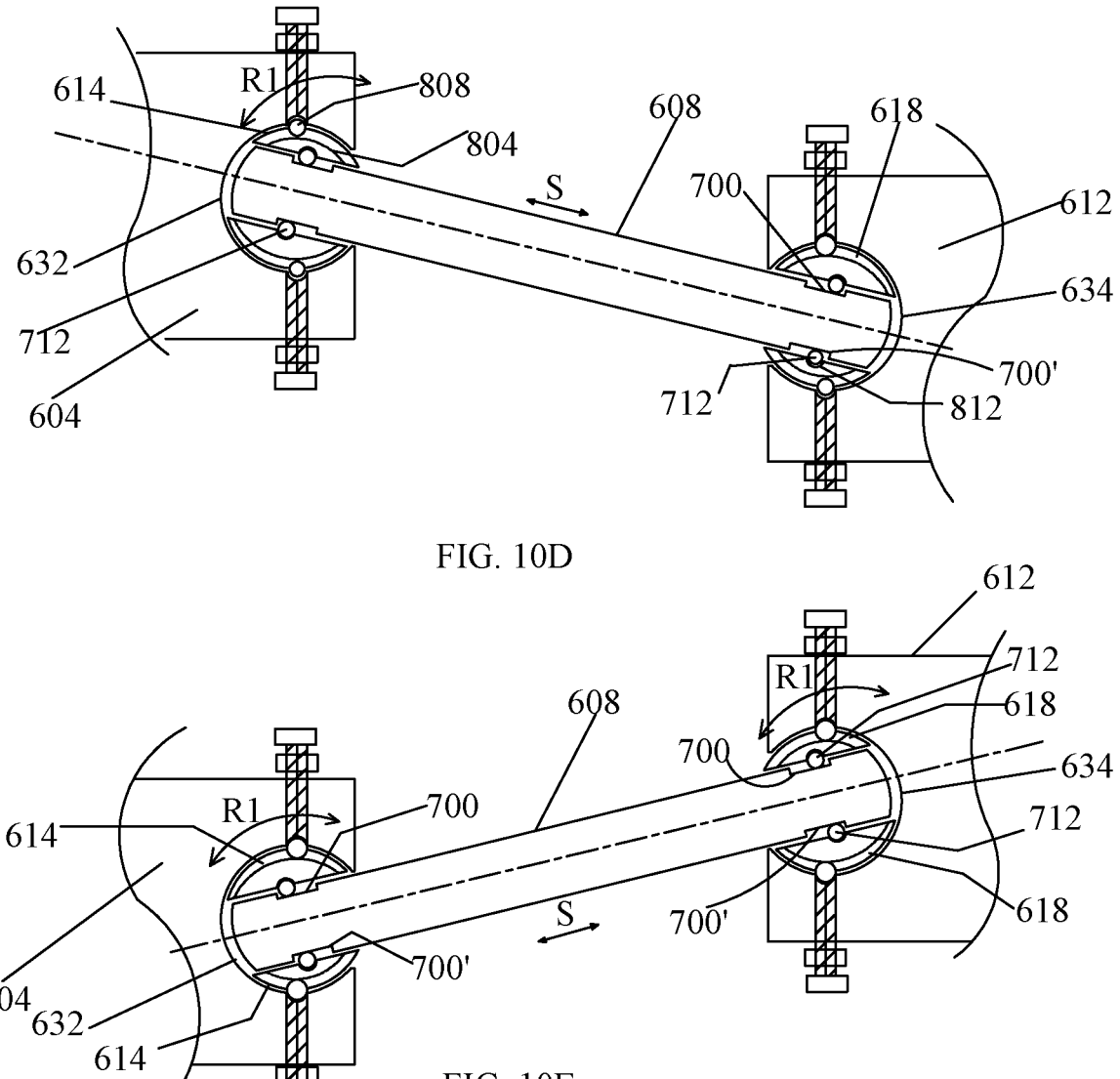
Figure 11:
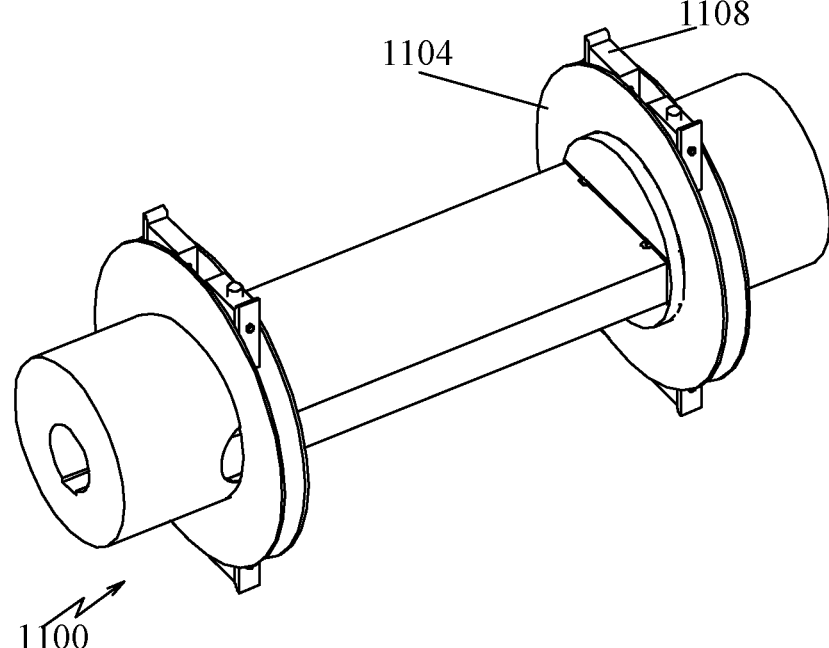

FIG. 2A is a side view of the self-aligning coupler of FIG. 1 without opposed rings along axis-Y and axis-Z that are inclined to each other and having a first detailed view FIG. 2C and a second detailed view FIG. 2D generated therefrom;

FIG. 2B is a top view of the self-aligning coupler of FIG. 1 without the opposed rings showing along axis-Y and axis-Z that are inclined to each other and located in different planes;

FIG. 3 is an exploded view of the self-aligning coupler of FIG. 1 along axis-X;

FIG. 4A shows a first working position, FIG. 4B shows a second working position and FIG. 4C shows a third working position of the self-aligning coupler of FIG. 1;

FIG. 5 shows a side perspective view another embodiment of the self-aligning coupler of FIG. 1 having an adjustable length tie rod 504;

FIG. 5A shows a side perspective view of the self-aligning coupler of FIG. 5 showing insertion of plates 508 and 512 in the cylindrical tie rod 504;

FIG. 6A shows another embodiment 600 of the self-aligning coupler 100;

FIG. 6B shows another embodiment of the self-aligning coupler 600 of FIG. 6A showing enlarged view FIG. 6C of a tie rod 608 positioned between a pair of insert guides 614 wherein rings are removed from the respective couplers;

FIG. 7 shows an exploded view of the self-aligning coupler 600 of FIG. 6A;

FIG. 8 shows a perspective view of an insert of the pair of insert guides of the self-aligning coupler 600 of FIG. 6A;

FIG. 9 shows a front view of a screw-nut assembly of the self-aligning coupler 600 of FIG. 6A;

FIG. 10A, FIG. 10F, FIG. 10G, and FIG. 10H shows steps involved in a method of positioning tie rod in the coupler in the assembly of the self-aligning coupler of FIG. 6A;

FIG. 10B is a cross sectional view of the self-aligning coupler of FIG. 6A showing positioning of the balls 712 of FIG. 6A;

FIG. 10C is a cross sectional view of the self-aligning coupler of FIG. 6A showing positioning of balls 808 of the self-aligning coupler of FIG. 6A;

FIG. 10D is a cross sectional view of the self-aligning coupler of FIG. 6A showing first position of the inserts 614, 618;

FIG. 10E is a cross sectional view of the self-aligning coupler of FIG. 6A showing second position of the inserts 614, 618;

FIG. 11 another embodiment of the 1100 of the self-aligning coupler 600; and

Figure 12:
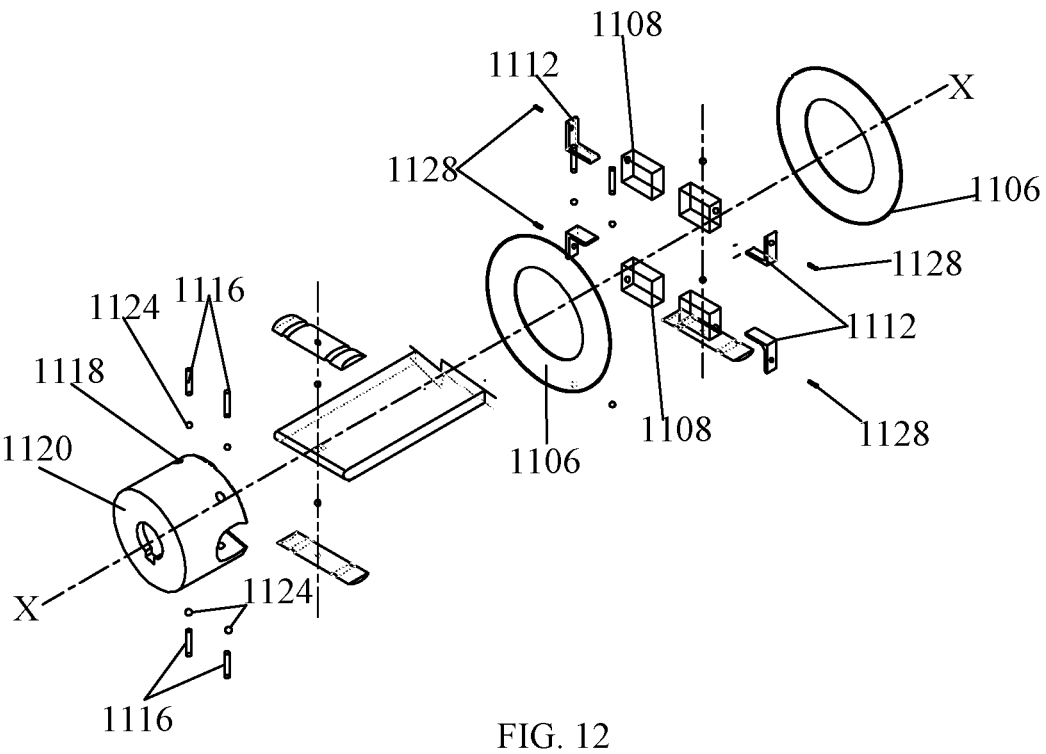

FIG. 12 shows an exploded perspective view of a portion the self-aligning coupler 1100 of FIG. 11.

DETAILED DESCRIPTION OF THE INVENTION

The invention described herein is explained using specific exemplary details for better understanding. However, the invention disclosed can be worked on by a person skilled in the art without the use of these specific details.

References in the specification to "one embodiment" or "an embodiment" means that particular feature, structure, characteristic, or function described in connection with the embodiment is included in at least one embodiment of the invention. The appearances of the phrase "in one embodiment" in various places in the specification are not necessarily all referring to the same embodiment.

References in the specification to "preferred embodiment" means that a particular feature, structure, characteristic, or function described in detail thereby omitting known constructions and functions for clear description of the present invention.

The foregoing description of specific embodiments of the present invention has been presented for purposes of illustration and description. They are not intended to be exhaustive or to limit the present invention to the precise forms disclosed, and obviously many modifications and variations are possible in light of the above teaching.

In general aspect, the present invention is a self-aligning coupler 100 that connects two shafts that are inclined to each other and are located in different planes.

Referring to FIGS. 1A and 1B, the self-aligning coupler 100 in accordance with a preferred embodiment of the present invention is shown. The self-aligning coupler 100, hereinafter referred as coupler 100 includes a first coupler 104, a tie rod 108 and a second coupler 112. The first coupler 104 is preferably connected to a driving shaft i.e. prime mover and the second coupler 112 is preferably connected to a driven shaft. The first coupler 104 receives the first end of the tie rod 108 and the second coupler 112 receives the second end of the tie rod 108.

The first coupler 104 as well as second coupler 112 is preferably a cylindrical construction. C1 is a central axis of the first coupler 104, X is central axis of the tie rod 108, and C2 is central axis of the second coupler 112. It is noted, however, that in another embodiment, the coupler is a constructed with a rectangular cross-section. The first coupler 104 receives rotational motion from the driving shaft and transfers the same to the second coupler 112 and the driven shaft through the tie rod 108. While transferring motion from the from the first coupler 104 to the second coupler 112 the tie rod 108 advantageously include three degrees of freedom of movement indicated by arrows 'P', 'Q' and 'R'.

Now referring to the FIGS. 1B, 2A and 2B, the self-aligning coupler 100 is described. The self-aligning coupler 100 has three degrees of freedom of movement. Accordingly, the tie rod 108 is movable in a direction indicated by arrow 'P' that defines a first degree of freedom. The tie rod 108 is movable in another direction as indicated by arrow 'Q' that defines a second degree of freedom. The tie rod 108 is movable in another direction as indicated by arrow 'R' that defines a third degree of freedom.

Referring to FIG. 3, an exploded view of the self-aligning coupler 100 along axis-X is shown. The self-aligning coupler 100 includes the first coupler 104, the tie rod 108, the second coupler 112, a first pair of insert guides 304, and second pair of insert guides 308, a first ring 312 and a second ring 316. One end of the first coupler 104 includes an approximately central hole for 320 receiving the driving shaft. Another end of the first coupler 104 includes a first cylindrical arcuate opening 324 defining an arcuate opening. Similarly, one end of the second coupler 112 includes an approximately central hole 326 for receiving the driven shaft and another end of the second coupler 112 includes a second cylindrical opening 328 that defines an arcuate opening.

The tie rod 108 in accordance with the present invention is a flat construction with opposed projections 336, 340 at each end. The cross-section of each of the projections 336, 340 is approximately rectangular. The tie rod 108 also has a rectangular cross section. The first arcuate opening 324 receives the projection 336. The projection 336 is received in the arcuate opening 324 such that the projection 336 is positioned between the first pair of insert guides 304.

Similarly, the second cylindrical opening 328 receives the projection 340 such that the projection 340 is positioned between the second pair of insert guides 308. It is to be noted that the pairs of insert guides 304, 308 is positioned in the respective arcuate openings 324, 328 to receive the respective projection 336, 340 by maintaining a gap between the pair of guides 304, 308 that is appropriate for receiving the projection 336, 340 and to guide the projection 336, 340. The pair of insert guides 304, 308 and the projections 336, 340 is movable relative to the respective coupler 104, 112.

The first ring 312 is connected to the first coupler 104 for securely connecting the tie rod 108 to the first coupler 104. Similarly, the second ring 316 is connected to the second coupler 112. It is to be noted that the first ring 312 and the second ring 316 advantageously strengthens the coupler 100 during operation.

Now referring to FIG. 4, a first extreme position, an intermediate position and a third extreme position of the coupler 100 is shown. In the first extreme position the axis of the first coupler 104 is below relative to the axis of the second coupler 112. In the second intermediate position, the axis of the first coupler 104 is approximately coinciding with the axis of the second coupler 112. In the third extreme position the axis of the first coupler 104 is above relative to the axis of the second coupler 112.

As shown in FIG. 5, another embodiment 500 of the self-aligning coupler 100 is described. In this embodiment, the coupler 500 includes a tie rod 504 that has a circular cross-section and cylindrical in shape. It is to be noted that the length of the tie rod 504 is adjustable in accordance with the requirement of the distance between the driver and the driven shaft through the tie rod 504. The tie rod 504 includes a pair of opposed plates 508 and 512. It is noted that in this embodiment each of the plates 508 and 512 has rectangular cross section. The opposed plates 508 and 512 are removably positionable in the respective opposed ends of the tie rod 504.

Referring to FIG. 5A, the tie rod 504 includes opposed pockets 516 and 520. The plate 508 is receivable in the pocket 516 by moving the plate 508 in a direction indicated by arrow '1'. Similarly, the plate 512 is receivable in the pocket 520 by moving the plate 512 in a direction indicated by arrow '2'. The plate 508 is secured in the pocket 516 by bolts 524 that is received in the tapped holes 528 on the tie rod 504. The plate 508 also includes a plurality of holes 532.

The plate 508 is removably insertable in the pocket 516, and the plate 512 is removably insertable in the pocket 520. In the inserted position of the plate 508 in the pocket 516, the bolt 524 is received in the hole 532 through the hole 528. It is noted that the holes 532 in the plate are blind holes. In the inserted position of the plate 512 in the pocket 520. A self-aligning coupler 500 for power transmission between driving shaft and driven shaft, wherein the bolt 524 is received in the hole 532 through the hole 528. In accordance with the present invention, the distance between the driven shaft and the driver shaft is adjustable by changing the positions of the plates 508, 512 that are inserted in the respective pocket 516, 520.

Referring to FIGS. 6A and 6B, another embodiment 600 of the self-aligning coupler 100 in accordance with the present invention is described. Accordingly, the self-aligning coupler 600 includes the first coupler 604, the tie rod 608, the second coupler 612, a first pair of insert guides 614, and second pair of insert guides 618, a first pair of screw nut assembly 624 and a second pair of screw nut assembly 628. The coupler 600 also includes a first ring 605, and a second ring 613. The inserts 614 are radially movable in the arcuate opening 632 in a direction indicated by arrow P. The first ring 605 is securely connected to the first coupler 604 for securely connecting the tie rod 608 to the first coupler 604, and similarly the second ring 613 is connected to the second coupler 612.

The first pair of insert 614 is positioned in a first cylindrical opening 632 defined in the first coupler 604, and the second pair of insert guide 618 is positioned in a second cylindrical opening 634 of the second coupler 612. One end of the first coupler 604 includes an approximately central hole for 636 receiving the driving shaft. The hole 636 is a blind hole. Another end of the first coupler 604 includes a first cylindrical opening 632 that is a through opening that runs from one end to other end of the coupler in an axis normal to the perpendicular central axis-Y of the self-aligning coupler 600.

It is noted that a first coupler 604 includes a first pair of screw nut assembly 624 positioned above the first cylindrical opening 632, and second pair 624 below the cylindrical opening 632. A second coupler 612 includes another pair of screw nut assembly 628 positioned above the first cylindrical opening 634, and another pair 628 below the cylindrical opening 634.

The first coupler 604 includes the first cylindrical opening 632 on one side and a blind hole 636 on the other side of the first coupler 604. Similarly, the second coupler 612 includes the second cylindrical opening 634 on one side and a blind hole 640 on the other side of the second coupler 612. The first pair of screw nut 624 and the second pair of the screw nut 624 are opposedly positioned on the first opening 632 of the first coupler 604. Similarly, the third pair of screw nut 628, and the fourth pair of the screw nut 628 are opposedly positioned on the second cylindrical opening 634 of the second coupler 612.

In this embodiment the various dimensions are of the self-aligning coupler 600 as follows. The first coupler 604 and the second coupler 612 has diameter of approximately 300 mm, length 300 mm. The length of the tie rod 608 is approximately 550 mm. The two shafts and thereby the couplers 604, 612 that are connected by the device are 170 mm off set from each other. The distance between the planes of the couplers 604 and 612 is approximately 135 mm. The motion of the tie rod 608 is in the range of 10 mm to 30 mm, in this one embodiment. The balls 712 and 808 are preferably made of steel material and has diameter of approximately 10 mm.

Now referring to FIG. 7, an exploded view of the self-aligning coupler 600 is shown. The exploded view of the self-aligning coupler 600 along axis-Y is shown. The self-aligning coupler 600 includes the first coupler 604, the tie rod 608, the second coupler 612, the first pair of insert guides 614, and second pair of insert guides 618, a first ring 605 and a second ring 613. The coupler 604 includes a plurality of threaded holes 625 such that a pair of holes 625 is on top portion of the coupler 604 and another pair of holes 625 is positioned on the bottom portion of the coupler 604. Similarly, the coupler 612 includes a plurality of holes 629 such that a pair of holes 629 is on top portion of the coupler 612 and another pair of holes 629 is positioned on the bottom portion of the coupler 612.

One end of the first coupler 604 includes an approximately central hole 636 for receiving the driving shaft, and other end includes the cylindrical opening 632 for receiving the pair of inserts 614. Similarly, one end of the second coupler 612 includes an approximately central blind hole 640 for receiving the driven shaft and another end of the second coupler 612 includes a cylindrical opening 634 for receiving pair of inserts 618. The first ring 605 is positioned on the first coupler 604 for securely connecting the tie rod 608 to the first coupler 604. Similarly, the second ring 613 is positioned on the second coupler 612. It is to be noted that the first ring 605 and the second ring 613 advantageously strengthens the coupler 600 during operation.

The tie rod 608 in accordance with the present invention is a flat body construction with a rectangular cross section. The tie rod 608 includes two opposed ends. Each of the end includes a pair of opposed pockets 700 and 700', hereinafter referred as 700. These pockets are blind holes and not through holes. A first pocket 700 is positioned on a top side and another pocket 700' on bottom side. The first pocket 700 and the second pocket 700' are concentric and collinear along axis-A. Each of the pockets 700 receives a steel ball 712. The cross-section of each of the tie rod 608 is approximately rectangular.

Now referring to FIGS. 7 and 8, a top perspective of an insert 800 of the pair of inserts 614 is shown. The inserts 614/618, are hereinafter, collectively referred as insert 800. It is to be noted that the pairs of insert 614, 618 is positionable in the respective openings 632, 634. The insert 800 of the pair of guides 614, 618 includes a hemispherical cross section such that the insert 800 has a flat bottom and arcuate top. Each insert 800 has a pair of radial groove 804 that runs on the outer arcuate surface of the respective insert 800. Each of the radial grooves 804 includes the ball 808 that is positioned in the holes 625/629 below the screw-nut assemblies 624/628.

The flat lower surface of the insert 800 includes a blind hole 812 that is approximately centrally positioned on the flat lower surface of the insert 800. The blind hole 812 has approximately circular opening and dome shaped bottom. The blind hole 812 also receives a steel ball 712 in a direction indicated by arrow 'R2'. Similarly, each of the inserts 614/618 include pair of radial grooves 804 that receives ball 808 in a direction indicated by arrow R1, and blind hole 812 includes the ball 712. In another aspect, the insert includes a quote of wear resistant material. Alternatively, separate wear resistant materials plates are positioned on body of the insert 800.

Now referring to FIG. 9 a screw nut assembly 900 of the pair of the screw nut assembly 624, 628 (FIG. 6B) is shown. The screw nut assembly 900 includes a bolt 904 having a head 906, a check nut 908 and a scale 912. The check nut 908 is threadably rotatably movable along length of the bolt 904 between a bottom portion and the head 906 of the bolt 904. The bolt also includes the scale 912 that is defined along the length of the bolt 904.

The scale 912 guides a user for locating position of the bolt 904. The check nut 908 is tightened after locating position of the bolt 904 to securely position the bolt at respective position. The bottom portion of the bolt 904 has a dome shaped opening 916 to receive the ball 808 located in the respective radial groove of the insert. The screw nut assembly 900 is receivable in the first coupler 604 and second coupler 612 in the holes 625 and 629 respectively. A screw of each of the screw nut assemblies 900 guides and locks positions of the inserts 614/618 by balls 808, and tie rod 608 by balls 712.

As shown in FIG. 10A-10E, a preferred method of assembly of the tie rod 608 and the coupler 612 is described. In a first step, ball 712 is inserted in the pocket 700 from a top side, and similarly another ball 712 is inserted in the pocket 700' from the bottom side of the tie rod 608. In a second step, the pair of inserts 618 is positioned on one end of the tie rod 608 such that the blind hole 812 of each insert 618 is positioned approximately over the top pocket 700 and bottom pocket 700' of tie rod 608 to form a first assembly A1. Accordingly, the ball 712 is positioned partially in the pocket 700 and partially in blind hole 812 of the inserts 618. And similarly, another ball 712 is positioned partially in the pocket 700 and partially in blind hole 812 of the inserts 618.

In the next step, one insert is positioned form the top side of the end of the tie rod 608 in a direction indicated by arrow 10A, and other insert is positioned from the bottom side of the end of the tie rod 608 in a direction indicated by arrow 10B. Accordingly, the ball 712 is partially positioned in the hole 812 of the insert 618, and partially positioned in the pocket 700. Similarly, from the bottom side of the tie rod 608, another ball 712 is positioned in the respective pocket 812 of respective inert 618 and partially positioned in the pocket 700'.

In a next step, the first assembly A1 is positioned in the opening 634 of the coupler 612 in a direction indicated by arrow 10C to form a second assembly 'A2'. In a next step, the ball 808 is inserted in the hole 629 such that the ball 808 is received in the radial groove 804 of the insert 618. In a next step, the screw 628 is screwed in the hole 629 such that the ball just touches the end 916 (Ref. FIG. 9) of the screw 628.

The FIG. 10D and FIG. 10E show different positions of the inserts 614 and 618 that are moved in the direction indicated by 'R1' from a first position to a second position. It is noted that after the assembly, the inserts 614, 618 are radially movable in a direction as indicated by arrows 'R1' about a center of the opening 632, 634. It is also noted that respective tie rod 608 is horizontally movable in a direction as indicated by arrow 'S' (Ref. FIGS. 10D and 10E) relative to the balls 712.

In the first position of the inserts 614, 618 (Ref. FIG. 10D) a lower end of the opening 632 constrains the motion of the tie rod and similarly the upper end portion of the opening 634 constrains the motion of the tie rod 608. In the second position of the inserts 614, 618 (Ref. FIG. 10E) a top end portion of the opening 632 constrains the motion of the tie rod and similarly the lower end portion of the opening 634 constrains the motion of the tie rod 608. It is understood that assembly of the tie rod 608 and the coupler 604 is done by similar steps described above.

Referring to FIGS. 11 and 12, another embodiment 1100 of the self-aligning coupler 100 is shown. In this embodiment, the self-aligning coupler 1100 has similar elements as that of the first embodiment except that of the structure of the ring 1104. In this embodiment, the ring includes a pair of identical plates 1106, a plurality of blocks 1108, and a plurality of wedges 1112. The plate 1104 is defined by the pair of identical plates 1106 that are securely connected by blocks 1108 by welding, soldering joint or are inbuilt.

In this embodiment, four blocks 1108 are positioned between the two rings 1106. In this embodiment, the screws 624 (Ref. FIG. 6B) are replaced by pins 1116 insertable in the holes 1118 on the coupler 1120. Each of the pins 1116 include a dome shaped opening in bottom portion for receiving respective balls 1124. The wedges 1112 are inserted and tightened on the blocks 1108 preferably by screws 1128, and pins 1116 constrain the motion of the respective balls 1124.

Referring to FIGS. 6 to 10, a preferred method of assembly of the self-aligning coupler 600 is described. In a first step, the first tie rod 608 is taken and the top and bottom pocket 700/700' on the opposed ends of the tie rod 608 are located. Then balls 712 are positioned on in each of the top and bottom pockets 700, 700' of the tie rod 608. Similarly, the balls are positioned in the pockets on another side of the tie rod 608 to achieve the first assembly.

In a next step, a pair of inserts 614 is positioned on one end of the tie rod 608 and similarly a second pair of inserts 618 is positioned on the other end of the tie rod 608 to define a second assembly. The inserts 614 are located on the tie rod 608 such that a half of the ball 712 is positioned in the hole 700 and other half is located in the dome shaped opening 812 in the bottom of the insert 614. Similarly, the inserts 618 are located on the tie rod 608 such that a half of the ball 712 is positioned in the hole 700' and other half is located in the dome shaped opening 812 in the bottom of the insert 618. In a next step, the second assembly is positioned in the respective openings 632 and 634 of the couplers 604, 612.

In a next step, a ball 808 is inserted in the hole 625/629 of the coupler 604/612. The ball 808 is received in the radial groove 804 of the respective insert 614/618. Then the screw nut assembly 900 is tightened as per requirement by using the scale 912. It is noted that the depth of the groove 804 is such that a half of the body of the ball 808 is in the radial groove 804 and the another half is in the hole 625/629 of the coupler 604/612. In a next step, the screw 624/628 is fitted on the hole 625/629 in which the ball 808 was inserted in the previous step. According to the same method, ball 808 is inserted and screw 624/628 is fitted for each of the holes 625/629.

Referring to FIGS. 1 to 10, in operation, the first coupler 104 is connected to a driver shaft of a machine. Similarly, the second coupler 112 is connected to a driven shaft of the machine. The respective pairs of insert 304, 308 are inserted in the respective arcuate openings 324 and 328. The tie rod 108 of appropriate length is connected between the first coupler 104 and the second coupler 112. The self-aligning coupler 100 advantageously transmits rotational motion/torque from a driver shaft to a driven shaft that are that are inclined to each other and are in different planes. The couplers 104 and 112 has ability to take loads dynamically while moving in all positions. As per one more embodiment (FIG. 5, 6) the length of the tie rod 504 is adjustable as per the requirement.

It is noted that during the operations the tie rod 108 has three degrees of freedom. Similarly, the tie rod 608 located in the coupler opening 634 has three degrees of freedom. The inserts 614 are radially movable in the opening 632 in a direction indicated by arrow 'P', while the tie rod 608 is in motion. The ball 808 that is partially in the radial groove 804 and partially in the hole 625 of coupler 604 rotatably maintains its position in the groove 804. Simultaneously, the ball 712 located in the hole 812 of insert 614/618 and pocket 700/700' of tie rod 608 rotatably maintains its position and guides the tie rod 608.

These simultaneous motions allow the tie rod 608 to move in the second degree of freedom indicated by Q. The screw nut assembly 900 and especially the screw advantageously guides and locks the positions of the inserts 614/618 and tie rod 608 by balls 808. The rings 605/613 strengths the couplers 604/612 and constrains the tie rod 608 to come out of the coupler opening 632/634 in case of any failure. The tie rod 608 is movable in a direction indicated by arrow R to define the third degree of freedom. It is noted that the motion of the tie rod is in the range of 10 mm to 30 mm.

The self-aligning coupler 100 advantageously connects two shafts that are inclined to each other and are in different planes. The self-aligning coupler 100 advantageously allows multiple degrees of freedom for connection and transmission of motion from driver to driven shaft. The self-aligning coupler 100 advantageously connects shafts that are far apart from each other.

The embodiments were chosen and described in order to best explain the principles of the present invention and its practical application, to thereby enable others, skilled in the art to best utilize the present invention and various embodiments with various modifications as are suited to the particular use contemplated.

It is understood that various omission and substitutions of equivalents are contemplated as circumstance may suggest or render expedient, but such are intended to cover the application or implementation without departing from the scope of the present invention.

The invention claimed is:

1. A self-aligning coupler (600) for power transmission between driving shaft and driven shaft that are non-collinear and misaligned by connecting the driving shaft and the driven shaft comprising:
   a. a first coupler (604), the first coupler (604) configured to be connected to a driving shaft, the first coupler (604) receiving the first end of a tie rod (608) and the first coupler (604) including a first screw nut assembly (624) comprising two pairs of screw nut assembly;
   b. a tie rod (608), the tie rod having three degrees of freedom of movement connecting the first coupler (604) with a second coupler (612) and first coupler including the first screw nut assembly (624);
   c. the second coupler configured to be connected to a driven shaft and the second coupler (612) receiving the second end of the tie rod (608), and the second coupler (612) including a second screw nut assembly (628) comprising two pairs of screw nut assembly;
   d. pairs of inserts, comprising a first pair of insert (614), and second pair of insert (618) being radially movable in arcuate openings (632) of first coupler (604) and arcuate openings (634) of the second coupler (612) respectively;
   e. a pair of rings including a first ring (605) and a second ring (613), the first ring (605) is connected to the first coupler (604) for securely connecting the tie rod (608) to the first coupler (604), and the second ring (613) is connected to the second coupler (612);
   f. a plurality of screw nut assemblies (624)/(628), comprising the first screw nut assembly (624) configured to be receivable in the first coupler (604) in holes (625) and, the second screw nut assembly (628) configured to be receivable in the second coupler (612) in holes (629) respectively; and
   g. at least three positions of the couplers (604), (612) including a first extreme position, an intermediate position and a third extreme position;
   wherein a first pair of screw nut assembly (624) and a second pair of the screw nut assembly (624) being opposedly positioned on the first arcuate opening (632) of the first coupler (604), a third pair of screw nut assembly (628) and a fourth pair of the screw nut assembly (628) being opposedly positioned on the second arcuate opening (634) of the second coupler (612), a screw of each of the screw nut assemblies (900) guides and locks positions of the inserts (614)/(618) by balls (808), and the tie rod (608) by balls (712).

2. A self-aligning coupler (600) of claim 1, wherein the pair of inserts (614), (618) includes a hemispherical cross section such that the pair of insert (800) (i.e. (614)/(618)) includes a flat bottom and arcuate top.

3. A self-aligning coupler (600) of claim 2, wherein a flat lower surface of the insert (800) including a blind hole (812) that is approximately centrally positioned on the flat lower surface of the insert (800) receiving a steel ball (712).

4. A self-aligning coupler (600) of claim 3, wherein the steel ball (712) is partially positionable in the hole (812) of the insert (618), and partially positionable in a pocket (700) defining relative movement between first coupler (604), the tie rod (608) and the second coupler (612) maintains its position and guides the tie rod (608).

5. A self-aligning coupler (600) of claim 4, wherein from the bottom side of the tie rod (608), another ball (712) is positionable in a respective pocket (812) of the same insert (618) and partially positioneable in a corresponding pocket (700').

6. A self-aligning coupler (600) of claim 1, wherein the first screw nut assembly (624) including a bolt (904) having a head (906), a check nut (908) and a scale (912) being defined along the length of the bolt (904), the check nut (908) being threadably rotatably movable along length of the bolt (904) between a bottom portion and the head (906) of the bolt (904).

7. A self-aligning coupler (600) of claim 6, wherein a bottom portion of the bolt (904) including a dome shaped opening (916) to receive a ball (808) located in the respective radial groove of the insert.

8. A self-aligning coupler (600) for power transmission between driving shaft and driven shaft that are non-collinear and misaligned by connecting the driving shaft and the driven shaft comprising:
   a. a first coupler (604), the first coupler (604) configured to be connected to a driving shaft, the first coupler (604) receiving the first end of a tie rod (608) and the first coupler (604) including a first screw nut assembly (624) comprising two pairs of screw nut assembly;
   b. a tie rod (608), the tie rod having three degrees of freedom of movement connecting the first coupler (604) with a second coupler (612) and first coupler including the first screw nut assembly (624);
   c. the second coupler configured to be connected to a driven shaft and the second coupler (612) receiving the second end of the tie rod (608), and the second coupler (612) including a second screw nut assembly (628) comprising two pairs of screw nut assembly;
   d. pairs of inserts, comprising a first pair of insert (614), and second pair of insert (618) being radially movable in arcuate openings (632) of first coupler (604) and arcuate openings (634) of the second coupler (612) respectively;
   e. a pair of rings including a first ring (605) and a second ring (613), the first ring (605) is connected to the first coupler (604) for securely connecting the tie rod (608) to the first coupler (604), and the second ring (613) is connected to the second coupler (612);
   f. a plurality of screw nut assemblies (624)/(628), comprising the first screw nut assembly (624) configured to be receivable in the first coupler (604) in holes (625) and, the second screw nut assembly (628) configured to be receivable in the second coupler (612) in holes (629) respectively; and
   g. at least three positions of the couplers (604), (612) including a first extreme position, an intermediate position and a third extreme position;
   wherein the pair of inserts (614), (618) includes a hemispherical cross section such that the pair of insert (800) (i.e. (614)/(618)) includes a flat bottom and arcuate top;

wherein each insert (800) including a pair of radial grooves (804) running on outer arcuate surface of the respective insert (800), each of the radial grooves (804) including a ball (808) being positioned below the screw-nut assembly (624).

9. A self-aligning coupler (600) of claim 8, wherein a flat lower surface of the insert (800) including a blind hole (812) that is approximately centrally positioned on the flat lower surface of the insert (800) receiving a steel ball (712).

10. A self-aligning coupler (600) of claim 9, wherein the steel ball (712) is partially positionable in the hole (812) of the insert (618), and partially positionable in a pocket (700) defining relative movement between first coupler (604), the tie rod (608) and the second coupler (612) maintains its position and guides the tie rod (608).

11. A self-aligning coupler (600) of claim 10, wherein from the bottom side of the tie rod (608), another ball (712) is positionable in a respective pocket (812) of the same insert (618) and partially positioneable in a corresponding pocket (700').

* * * * *